United States Patent Office 3,459,862
Patented Aug. 5, 1969

---

3,459,862
ISOXAZOLE DERIVATIVES AND PROCESSES
FOR MAKING THEM
André Gagneux and Franz Hafliger, Basel, Switzerland,
and Conrad Eugster, Wallisellen, Zurich, Switzerland,
assignors to Geigy Chemical Corporation, Ardsley,
N.Y., a corporation of New York
No Drawing. Original application May 31, 1966, Ser. No.
553,674. Divided and this application Dec. 12, 1967,
Ser. No. 707,906
Int. Cl. A61k 27/00
U.S. Cl. 424—272       2 Claims

ABSTRACT OF THE DISCLOSURE

Pharmaceutical compositions containing amino-(3-hydroxy-5-isoxazolyl)acetic acid have been found to potentiate anesthesia, reduce motility, have catatonic and sedative effects, inhibit tremorin and tremor and possess antiemetic activity.

DETAILED DISCLOSURE

This application is a division of our application Ser. No. 553,674, filed May 31, 1966, which is in turn a continuation-in-part of our application Ser. No. 473,155, filed on July 19, 1965, now abandoned.

The present invention relates to a new isoxazole derivative, its salts, processes for the production of these novel compounds, as well as new pharmaceuticals containing them and the use of such pharmaceuticals.

In a first aspect, this invention concerns the novel α-amino-3-hydroxy-5-isoxazole acetic acid of the formula

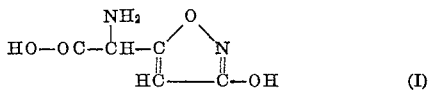

(I)

and its pharmaceutically acceptable salts, which novel compounds have an inhibiting action on the central nervous system, even in very small dosages. In particular, they strongly potentiate anesthesia, reduce motility, they have catatonic and sedative effects, inhibit tremorin tremor and also possess antiemetic activity.

The compound of Formula I, according to the invention, crystallizes from water as a monohydrate. The crystalline compound was found to be identical with a product produced by us in crystalline form from fungi of the type *Amanita muscaria* L., which product is of the empiric formula $C_5H_6N_2O_4 \cdot H_2O$ having a melting point of 144–145° and the further data as follows:

(1) Absorption in the UV spectrum:
λ max.=212 mμ, ε=5580 (7.2-n HCl);
λ max.=210 mμ, ε=6160 (water).

(2) Infrared spectrum in potassium bromide:

The infrared spectrum shows the following absorption bands, taken in KBr pellets: 2.95, 3.25, 3.45, 3.80, 4.25, 6.14, 6.28, 6.60, 6.68, 7.24, 7.72, 8.18, 8.53, 8.78, 8.83, 9.63, 9.73, 10.15, 10.60, 11.32, 11.96, 12.30, 13.40, 14.15, 14.45μ.

(3) Combustion analysis and determinations of molecular weights:

Combustion analysis gives the following values: 34.07% C; 4.42% H; 15.64% N; 45.30% O. The theoretical values for $C_5H_8N_2O_5$ are: 34.09% C; 4.58% H; 15.91% N; 45.42% O.

Cryoscopic determination of the molecular weight gives 169 (calculated value according to the formula $C_5H_8N_2O_5$

).

By potentiometric titration an equivalent weight of 91.6 and by hydrogenation in the presence of palladium/charcoal catalyst in aqueous sodium bicarbonate solution one of 88 is obtained.

The α-amino-3-hydroxy-5-isoxazole carboxylic acid produced according to the invention and its pharmaceutically acceptable salts with inorganic and organic bases can be administered orally, rectally or parenterally, particularly intramuscularly. Suitable salts for therapeutic administration are those with inorganic and organic bases, i.e. with bases which themselves have no undesirable physiological action in the usual dosages or which bring about a desirable action, e.g., a local anesthetic action particularly in forms for parenteral administration. Suitable salts are, e.g., sodium potassium, magnesium, calcium and ammonium salts, and also salts with ethylamie, triethylamine, ethanolamine, diethanolamine, diethylaminoethanol, ethylenediamine, benzylamine, procaine, pyrrolidine, piperidine, morpholine, 1-ethyl-piperidine or 2-piperidinoethanol.

The daily dosages of the free α-amino-3-hydroxy-5-isoxazole acetic acid or of pharmaceutically acceptable salts thereof to exert a depressant action on the central nervous system vary between 0.1 and 1 mg. per kilogram bodyweight. Suitable dosage units such as dragées (sugar coated tablets), tablets, suppositories or ampoules, preferably contain 2–25 mg. of the free acid or a pharmaceutically acceptable salt thereof.

Dosage units for peroral administration preferably contain between 1% and 90% of α-amino-3-hydroxy-5-isoxazole acetic acid or a pharmaceutically acceptable salt thereof as active ingredient. They are produced by combining the active ingredient with, e.g., solid pulverulent carriers such as lactose, saccharose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowaxes) of suitable molecular weight, to form tablets or dragée cores. The latter are coated, for example, with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g., to distinguish between different dosages of active ingredient.

Dosage units for rectal administration are, e.g., suppositories which consist of a combination of the active substance or a suitable salt thereof with a neutral fatty vehicle, or also gelatine rectal capsules which contain a combination of the active substance or a suitable salt thereof with polyethylene glycols (Carbowaxes) of suitable molecular weight.

Ampoules for parenteral, particularly intramuscular, administration preferably contain a water soluble salt of α-amino-3-hydroxy-5-isoxazole acetic acid in aqueous solution in a concentration of, preferably, 0.5 to 5%, optionally together with suitable stabilizing agents and buffer substances.

Tablets can be produced, for example, as follows:

10.0 g. of ammonium salt of α-amino-3-hydroxy-5-isoxazole acetic acid, 30.0 g. of lactose and 5.0 g. of unpressed Aerosil (highly dispersed silicic acid) are mixed, the mixture is moistened with a solution of 5.0 g. of gelatine and 7.5 g. of glycerin in distilled water and granulated through a sieve. The granulate is dried, sieved and carefully mixed with 3.5 g. of potato starch, 3.5 g. of talcum and 0.5 g. of magnesium stearate. The mixture is pressed into 1,000 tablets each weighing 65 mg. and containing 10 mg. of active substance (ammonium salt).

Another aspect of this invention concerns the production of α-amino-3-hydroxy-5-isoxazole acetic acid by a process comprising the following steps:

(a) The known 3-bromo- or 3-chloro-5-isoxazole carboxylic acid (cf. R. Fusco and S. Rossi, Rend., 1st., Lombardo Sci., Pt. I, Classe Sci. Mat. e. Nat. 94A, 729–740 (1960), CA 57, 16583d, e; or P. Bravo, G. Gaudiano, A. Quilico and A. Ricca, Gazz. Chim. Ital. 91, 47–64, particularly 60–63 (1961), CA 56, 12869, etc.) is reacted with a lower alkanol, e.g., methanol or benzyl alcohol and potassium hydroxide. The resulting 3-methoxy- or 3-benzyloxy-5-isoxazole carboxylic acid of the formula

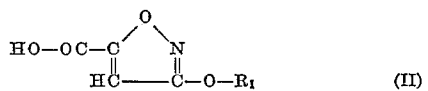 (II)

wherein $R_1$ represents benzyl or lower alkyl, especially methyl, is converted by way of its acid chloride to the N,N-ethylene amide and the latter is reduced with lithium aluminum hydride in ether, thereby affording the novel 3-benzyloxy- or 3-lower alkoxy-, particularly 3-methoxy-5-isoxazole carboxaldehydes of the formula

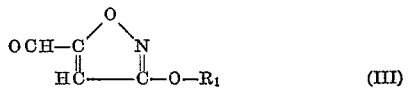 (III)

wherein $R_1$ has the same meaning as in Formula II.

(b) An aldehyde of Formula III is reacted with hydrocyanic acid to form a cyanhydrin of the formula

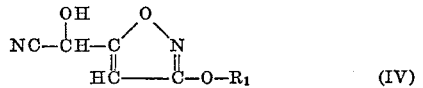 (IV)

wherein $R_1$ has the meaning given above.

Step (b) of the process according to this aspect of the invention affords quantitative yields when an excess of 100% hydrocyanic acid is used simultaneously as reactant and reaction medium, and the reaction is performed at temperatures of about 0° to 50° C.

(c) A cyanhydrin of Formula IV is converted to the corresponding imino ester, e.g., by treatment with a lower alkanol and hydrogen chloride in the cold. On the addition of water, this imino ester is converted to the respective lower alkyl ester of 3-substituted 5-isoxazole glycolic acid which ester is of the formula

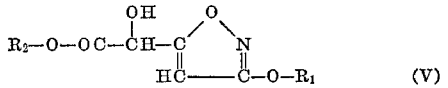 (V)

wherein $R_1$ has the meaning given above, and $R_2$ represents lower alkyl.

(d) A compound of Formula V is reacted with sulfonic or carboxylic acid halide, e.g., with p-toluene sulfochloride, p-bromobenzene sulfochloride, methane sulfochloride, acetyl chloride or trifluoroacetyl chloride in a tertiary organic base such as collidine, in the cold, whereby there is obtained the corresponding 3-substituted α-acyloxy-5-isoxazole acetic acid alkyl ester of the formula

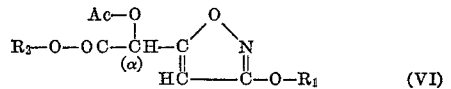 (VI)

wherein

Ac repesents the acyl radical of a sulfonic acid or carboxylic acid, e.g., an optionally substitued phenylsulfonyl radical such as p-toluene sulfonyl, also, e.g., methane sulfonyl, lower akanoyl, especially acetyl or trifluoroacetyl, and $R_1$ and $R_2$ have the meanings given above.

(e) First mode.—According to a first mode of procedure, a compound of Formula VI is then directly hydrolyzed at 25–35° C. with concentrated hydrobromic acid and with the amount of acetic acid necessary to form a solution, to obtain the corresponding reactive ester of the formula

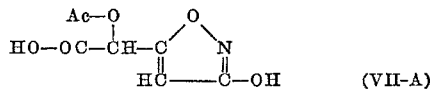 (VII-A)

wherein Ac has the same meaning as in Formula VI.

(e) Second mode.—According to a second preferred mode of procedure, which leads to higher yields, a compound of Formula VI is first reacted with an alkali metal halide, particularly with sodium bromide, or with sodium chloride, sodium iodide or potassium iodide, the reaction being performed at room temperature or moderately raised temperature in a suitable organic solvent such as dimethyl sulfoxide, thereby obtaining the corresponding 3-substituted α-halogen-5-isoxazole acetic acid alkyl ester of the formula

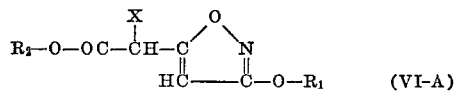 (VI-A)

wherein $R_1$ and $R_2$ have the meanings given above, and X represents chlorine, bromine or iodine, which ester is then, in turn, hydrolyzed under the same critical conditions that have been set forth in step (e) first mode, supra, leading to the corresponding α-halogen-substituted 3-hydroxy-5-isoxazole acetic acid of the formula

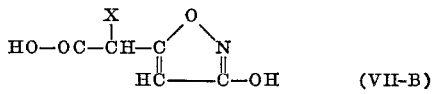 (VII-B)

wherein X has the same meaning as in Formula VIXA.

It is decisive for the success of the process according to this aspect of the invention that the conversion of compounds of Formula VI or VD–A to the reactive esters of 3-hydroxy-5-isoxazole glycolic acid occurs at their α-hydroxyl group; this is achieved by hydrolysis of the alkyl ester group and simultaneous ether cleavage under critical condition, namely using concentrated aqueous hydrobromic acid (about 48%) and preferably in the presence of acetic acid, in the narrow range of temperature mentioned above (25° to 35° C.), e.g., at 30° C.

This result could not have been foreseen; rather, decarboxylation had to be expected, as the 3-hydroxy-5-isoxazole glycolic acid in the tautomeric form of a vinylic β-keto acid.

(f) A reactive ester of the formula

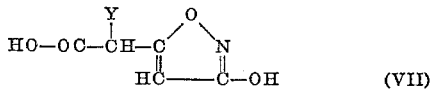 (VII)

wherein Y represents Ac—O— or X, Ac and X having the same meanings as in Formulas VI and VI–A, respectively, is finally reacted with ammonia, the reaction occurring at the α-hydroxyl group of this acid. The ammonium salt first obtained is then converted to the free acid of Formula I and, if desired, the latter is converted to a salt with another inorganic or organic base. Ammonia is used, for example, as concentrated aqueous solution in great excess, or in alcoholic solution. The reaction is performed, e.g., at room temperature or at a moderately raised temperature.

The conversion of an ester of Formula VII to the compound of Formula I which constitutes the last step in the production of α-amino-3-hydroxy-5-isoxazole carboxylic acid, offers no difficulties if, in the working up, care is taken that the acid mentioned is present in the form of an acid amphoterous ion.

A third aspect of this invention concerns the production of α-amino-3-hydroxy-5-isoxazole acetic acid by another process comprising the following steps:

(1) A lower alkyl 4-chloro-aceto-acetate is first ketalized, e.g., by boiling with anhydrous methanol, hydrogen chloride and methyl orthoformate to afford the corresponding alkyl 4-chloro-3,3-dimethoxybutyrate.

(2) By reaction of the latter with hydroxylamine, e.g., in methanol at room temperature, the corresponding ketalized 4-chloroacetoacethydroxamic acid is obtained, e.g., 4-chloro-3,3-dimethoxybutyrohydroxamic acid.

(3) The latter is converted by treatment with hydrogen chloride in glacial acetic acid or in a low alkanol such as methanol or ethanol at temperatures between about 0° and 50° C., into 5-chloromethyl-3-isoxazolol.

(4) The latter compound or another reactive ester falling under the formula

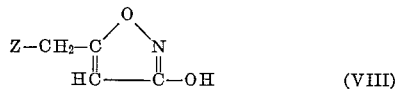
(VIII)

wherein Z represents p-toluene sulfonyloxy, methane sulfonyloxy, lower alkanoyloxy, especially acetyl, trifluoroacetyl, chlorine, bromine or iodine, is reacted with a salt of hydrocyanic acid, for example with potassium or sodium cyanide in a lower alkanol or alkanone at room temperature or moderately raised temperature, to form 3-hydroxy-5-isoxazole acetonitrile, of the formula

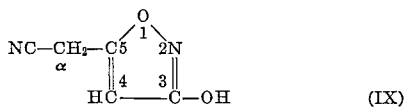
(IX)

(5) 3-hydroxy-5-isoxazole acetonitrile is reacted with bromine to obtain the bromination product of the formula

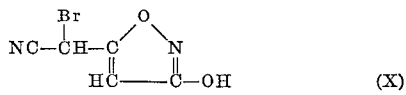
(X)

It is surprising and decisive for the success of the whole sequence of reactions of this process according to the third aspect of the invention, that the bromination occurs to a major degree in the $\alpha$-position and not in the 4-position which, in 3-isoxazolols, is quite reactive.

The bromination is performed, for example, in glacial acetic acid at room temperature (20° C.) or moderately raised temperature (40° C.) with irradiation.

(6) The brominated product of Formula X is then reacted with ammonia to obtain $\alpha$-amino-3-hydroxy-5-isoxazole acetonitrile of the formula

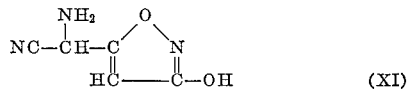
(XI)

A concentrated aqueous or alkanolic ammonia solution, for example, can be used for this reaction with $\alpha$-bromo-3-hydroxy-5-isoxazole acetonitrile. This reaction is performed at room temperature or slightly raised temperature; an excess of ammonia can also serve as acid binding agent.

Optionally, the nitrile of Formula XI can be converted into the corresponding imino lower alkyl esters or the corresponding lower alkyl esters of $\alpha$-amino-3-hydroxy-5-isoxazole acetic acid by reaction with hydrogen halide and a lower alkanol with anhydrous alcoholic hydrogen chloride solution and then, if desired, the imino alkyl ester is converted to the corresponding alkyl ester by treatment with water.

(7) The nitrile of Formula XI is hydrolyzed to the free acid of Formula I, e.g., by treatment with a mineral acid or with an alkali hydroxide in dilute aqueous-alkanolic solution. Hydrolysis of the above-mentioned esters of $\alpha$-amino-3-hydroxy-5-isoxazole acetic acid, e.g., the methyl or ethyl ester, or the methylimino or ethylimino ester, is effected by adsorption, e.g., from aqueous solutions of their salts, particularly of the hydrochlorides, on cation exchangers such as Dowex 50 (WX–12 $H^+$-form) exchange resin and elution with an acid, e.g., with dilute aqueous formic acid.

If desired, the free acid of Formula I is converted in a conventional manner to a salt with an inorganic or organic base.

A fourth aspect of the invention concerns the production of the crystalline compound of Formula I from fungi of the species *Amanita muscaria* L., which is performed by mincing fresh pilei in the presence of a lower alkanol, by repeated treatment with the same solvent, optionally with the increasing addition of water, concentration and defatting of the combined alkanol extracts, adsorption of the defatted extract concentrate on an ion exchange resin and elution of the latter with formic acid in increasing concentrations up to approximately double-normality, whereupon the fractions containing the active substance are identified by paper electrophoresis and crystallized by concentration.

The following nonlimitative examples illustrate the preceding aspects of the invention further. The temperatures are given in degrees centigrade. Percentages are by weight unless expressly stated otherwise.

Example 1

(6) 6.26 g. (4.5 mols) of 2-(2-nitrovinyl)-furan (produced according to J. Thiele and H. Landers, Ann. 369, 300 [1909]) in 6.26 liters of acetic acid and 3.13 liters of 48% hydrobromic acid are heated for 9 hours on a steam bath.

After concentrating the reaction mixture to 3 liters in vacuo, it is diluted with 3 liters of water, boiled, Hyflo and charcoal are added and, finally, the mixture is filtered. The crystals obtained on cooling are removed by filtration. The filtrate is extracted four times with 500 ml. of chloroform each time and the extracts so obtained are combined with the above crystals. The chloroform solution is dried over sodium sulfate and concentrated. After recrystallization of the residue from benzene and cyclohexane, the yield of 3-bromo-5-isoxazole propionic acid is 275 g. (28%); M.P. 102–106°.

(b) 44 g. (0.2 mol) of 3-bromo-5-isoxazole propionic acid are dissolved in 440 ml. of concentrated sulfuric acid and, at 15–20°, a solution of 80 g. (0.8 mol) of chromium trixoide in 80 ml. of water is added dropwise within about 3 hours while stirring.

The reaction mixture is poured onto 800 g. of ice and it is extracted three times with 500 ml. of ether each time. The combined ethereal extracts are dried over magnesium sulfate and concentrated and the residue is recrystallized from 500 ml. of benzene/toluene (1:1) whereupon 15.8 g. (41% of the theoretical) of 3-bromo-5-isoxazole carboxylic acid are obtained; M.P. 170–175°. A mixture of the end product and starting material (3:2) is obtained from the mother liquor which can be used in a following oxidation.

(c) 30.7 g. (0.16 mol) of 3-bromo-5-isoxazole carboxylic acid and 27 g. (0.48 mol) of potassium hydroxide in 540 ml. of benzyl alcohol are stirred for 2 hours at 140°. After cooling, 1.5 liters of water are added to the reaction mixture which is then extracted three times with 1.5 liters of ether each time. The aqueous phase is boiled for a short time with active charcoal, filtered and then concentrated hydrochloric acid is added. The crystals which precipitate are filtered off under suction, washed with water, dried and finally recrystallized from benzene. The yield of 3-benzyloxy-5-isoxazole carboxylic acid is 15 g. (43% of the theoretical); M.P. 119–122°.

(d) 13.1 g. (60 millimols) of 3-benzyloxy-5-isoxazole carboxylic acid in 65 ml. of thionyl chloride and 65 ml. of toluene are refluxed for 12 hours. Both solvent and excess reactant are distilled off at 60° under reduced pressure. The residue in 100 ml. of abs. ether is added dropwise, while stirring and cooling, to a solution of 2.6 g. (60 millimols) of ethyleneimine and 6.3 g. (62.5 millimols) of triethylamine in 150 ml. of abs. ether. After 30 minutes' reaction at 0°, a suspension of 1.14 g. (30 millimols) of lithium aluminum hydroxide in 100 ml. of ether is added in portions at 0°, the whole is stirred for another 30 minutes at 0° and then 200 ml. of 2 N sulfuric acid are added dropwise. The reaction solution is filtered through Hyflo, the ethereal phase is separated, washed twice with 1 N sodium bicarbonate solution, dried over magnesium sulfate and concentrated. The remaining 10.9 g. (90% of the theoretical) of 3-benzyloxy-5-isoxazole carboxaldehyde crystallise. According to thin layer chromatography and also NMR spectrum, the substance is uniform and can be further used directly.

(e) 6.5 g. of 100% hydrocyanic acid and 10 mg. of sodium cyanide are added to 12.2 g. (60 millimols) of 3-benzyloxy-5-isoxazole carboxaldehyde. After 10 minutes, an exothermic reaction takes place while the reaction mixture solidifies. The mixture is left to stand for 12 hours, dissolved in 200 ml. of abs. ether, active charcoal is added to the solution which is then filtered. The ether is evaporated off under reduced pressure and 13.8 g. of 3-benzyloxy - 5 - isoxazole carboxaldehyde cyanhydrin (100% of the theoretical) are obtained; M.P. 92–98°. The substance can be further used directly. On recrystallizing from benzene/cyclohexane (1:1) the M.P. rises to 102–103°.

(f) 33 g. (900 millimols) of hydrogen chloride gas are introduced while cooling with ice, into a solution of 14 g. (60 millimols) of crude 3-benzyloxy-5-isoxazole carboxaldehyde cyanhydrin in 140 ml. of abs. ethanol. The solution solidifies within 2 hours into a thick slurry which is left to stand for 48 hours at 20°. The solvent is then eavporated off under reduced pressure, 100 ml. of water are added to the residue and the pale yellow oil formed is taken up in ether/benzene (1:1). The organic phase is washed with water, 1 N sodium bicarbonate solution and again with water, dried over magnesium sulfate and concentrated under reduced pressure. 15.6 g. (95% of the theoretical )of 3-benzyloxy-5-isoxazole glycolic acid ethyl ester in the form of pale yellow crystals remain as residue, M.P. 49–55°.

(g) 11.4 g. (60 millimols) of p-toluene sulfonyl chloride in 50 ml. of sym-collidine are added, while cooling with ice, to a solution of 15.0 g. (54 millimols) of 3-benzyloxy-5-isoxazole glycolic acid ethyl ester in 20 ml. of sym.-collidine and the whole is left to stand for 24 hours at 5°. The thick red slurry formed is dissolved, while cooling with ice, in 1 liter of 1 N hydrochloric acid and 500 ml. of ether. The organic phase is separated and washed with 1 N hydrochloric acid, water, 1 N sodium bicarbonate solution and again with water before drying it over magnesium sulfate and evaporating under reduced pressure. The residue, 19.2 g. of a red-violet oil and crystal mixture, is dissolved in 50 ml. of benzene and chromatographed on 300 g. of Kieselgel. With cyclohexane, a small amount of p-toluene sulfonic acid chloride is eluted, whereupon, with benzene/chloroform (1:1), the desired 3-benzyloxy-5-isoxazole glycolic acid ethyl ester-p-toluene sulfonate is eluted. After recrystallization from hexane, the yield is 60% (14.0 g.); M.P. 75–78°.

(h) 10.8 g. (25 millimols) of 3-benzyloxy-5-isoxazole glycolic acid ethyl ester-p-toluene sulfonate and 5.15 g. (50 millimols) of sodium bromide in 100 ml. of dimethyl sulfoxide are stirred for 3 hours at 30°. The mixture is then poured into 1 liter of ice water and it is extracted three times with 500 ml. of ether/benzene (1:1) each time. The combined organic phases are washed with 300 ml. of water, dried over magnesium sulfate and concentrated. The oily residue, an orange colored oil, is dissolved in 50 ml. of benzene and chromatographed on a column of 100 g. of Kieselgel using as eluants cyclohexane and benzene. After evaporation of the benzene fraction, 6.54 g. (77% of the theoretical) of 3-benzyloxy-α-bromo-5-isoxazole acetic acid ethyl ester are obtained, $n_D^{21}$ 1.5458.

(i) 2.0 g. (5.9 millimols) of 3-benzyloxy-α-bromo-5-isoxazole acetic acid ethyl ester in 20 ml. of 48% hydrobromic acid and 30 ml. of glacial acetic acid are stirred for 15 hours at 30°. The acetic acid is distilled off within 1 hour at 30° under 12 torrs. 200 ml. of water and solid sodium bicarbonate are added to the residue until an alkaline reaction is obtained. After extracting twice with 100 ml. of ether each time, the mixture is acidified with 48% hydrobromic acid and extracted on a Kutscher-Steudel apparatus for 20 hours with ether. After drying the organic phase over magnesium sulfate, and concentrating, 1.30 g. (about 100% of the theoretical) of crude α-bromo-3-hydroxy-5-isoxazole acetic acid are obtained as a viscous oil. Its structure was confirmed by IR and NMR spectra as well as by microtitration.

(j) 1.3 g. (5.9 millimols) of crude α-bromo-3-hydroxy-5-isoxazole acetic acid are left to stand for 5 hours at 20° in 28 ml. of concentrated ammonia solution. The excess ammonia is removed by suction at 20° under 12 torrs, 60 ml. of water are added to the residue as well as 1 g. each of active charcoal and Celite; the mixture is then filtered. The pale yellow filtrate is concentrated at 40° under reduced pressure, the residue is dried over phosphorous pentoxide and slurried with 20 ml. of methanol and 20 ml. of tetrahydrofuran. After filtering, 400 mg. (35% of the theoretical) of α-amino-3-hydroxy-5-isoxazole acetic acid ammonium salt hydrate are obtained. It decomposes at 120°. The amphoterous ion hydrate which melts at 144–145°, is obtained by chromatography on Amberlite IRC-50 using as eluants water and formic acid. The substance may also be obtained by chromatography on Amberline IR–120 (H+-form) and eluation with water.

Example 2

(a) 2.7 ml. of abs. methanol are saturated at 0° with dry hydrogen chloride. A mixture of 10.0 g. of γ-chloroacetoacetic acid ester (produced according to C. D. Hurd and J. L. Abernethy, J. Am. Chem. Soc. 62, 1147 [1940]), 20.0 g. of orthoformic acid methyl ester and 13 g. of abs. methanol is added thereto. The mixture is refluxed for 4 hours with exclusion of water. While still hot, the reaction mixture is poured into 200 ml. of ice water while stirring, the pH is immediately adjusted to 8 with 30% sodium hydroxide solution and the mixture extracted four times with ether. The ether extract is dried over magnesium sulfate. After evaporating off the ether, the oil which remains is fractioned in a 5 cm. Vigreux column. A main fraction boiling at between 101° and 103° under 11 torrs is obtained which does not react with aqueous FeCl₃ solution.

(b) A solution of 35.0 g. of hydroxylamine hydrochloride (0.5 mol) in 210 ml. of hot absolute methanol is cooled for a short time in an ice bath and a solution of 42 g. of potassium hydroxide (0.75 mol) in 155 ml. of absolute methanol is, while stirring under nitrogen, added at such a rate that the temperature of the reaction solution does not rise above 20°. On completion of the addition of alkali, the whole is stirred for 5 minutes in an ice bath, the mixture is filtered under suction through a porous glass funnel, and the residue is washed with a small amount of methanol. A solution of 35.9 g. of 4-chloro-3,3-dimethoxybutyric acid ethyl ester in 20 ml. of methanol is immediately added to the filtrate and the whole is left to stand for 96 hours in an atmosphere of nitrogen. After a few hours there is a slight precipitation of crystals (KCl). The reaction solution is concentrated in vacuo; the residue is dissolved in double the amount of water and fractionated on an anion exchanger column (Dowex). The column is washed neutral with water and then eluated with 2 N acetic acid. At the beginning of the acid zone the eluate is alkaline for a short time; towards the end of this alkaline fraction, the FeCl₃ test is positive (wine red). The FeCl₃ positive eluate is collected and concentrated in vacuo at 40°. The pale yellow crystalline residue is evaporated 5 times with water in vacuo until it is free from acetic acid and then it is dried for 12 hours at 40°/ 0.5 torr. The 4-chloro-3,3-dimethoxyhydroxambutyric acid obtained is completely soluble in methanol, M.P. 107–110°.

For analysis it is recrystallized three times from acetone and then sublimed in a bulb tube at 120°/10⁻⁵. The white sublimate melts at 129–131° and sinters from 124°.

(c) 5.0 g. of crude 4-chloro-3,3-dimethoxyhydroxambutyric acid in 130 ml. of glacial acetic acid are saturated, while stirring with a magnet stirrer at 0°, with dry hydrogen chloride and then left to stand at room temperature for 16 hours. The pale brown solution is concentrated in vacuo at 40°, water is added three times to the residue which is then concentrated in vacuo. The yellow crystalline product so obtained is extracted twice while warm with 130 ml. of ether each time, the yellow ether solution is filtered and concentrated whereupon pale yellow needles remain which melt at 90–95°. The product, which is still not quite pure, is instable. It can be purified by careful recrystallisation from carbon tetrachloride or acetone or by sublimation (in small portions) under high vacuum. The pure 5-chloromethyl-3-isoxazolol is considerably more stable: white needles which melt at 97–101° (sinter from about 80°) and show a strong acid reaction in aqueous solution.

(d) A solution of 2 g. of potassium cyanide in 10 ml. of 50% ethanol is added to 2 g. of 5-chloromethyl-3-isoxazolol dissolved in 10 ml. of 50% ethanol and the whole is left to stand for 24 hours at room temperature. The reaction mixture is then acidified with 2 N sulphuric acid and evaporated to dryness in vacuo. The residue is extracted with ethanol, the extract is decoloured with animal charcoal and the 3-hydroxy-5-isoxazole acetonitrile is crystallised by concentration and cooling. It can be used directly for the next step. After purification by sublimation under high vacuum it melts at 169–171°.

(e) 646 mg. of bromine dissolved in 32 ml. of glacial acetic acid are added to 500 mg. of the above nitrile in 25 ml. of glacial acetic acid and the mixture is left to stand at room temperature with irradiation from a Wolfram lamp (60 watt) until it is colorless. After evaporating in vacuo, the residue is chromatographed on a Kieselgel (Mallinckrodt) column with chloroform/acetone (1:1). A crystallised fraction is obtained which, according to IR and NMR spectra and analysis, contains α-bromo-3-hydroxy-5-isoxazole acetonitrile with 4-bromo-3-hydroxy-5-isoxazole acetonitrile as impurity. The product is advantageously used for further reaction without purification.

(f) 10 ml. of concentrated aqueous ammonia solution are poured over 500 mg. of crude α-bromo-3-hydroxy-5-isoxazole acetonitrile and the solution is left to stand for about 14 hours and then concentrated in vacuo whereupon crude α-amino-3-hydroxy-5-isoxazole acetonitrile is obtained.

(g) The crude nitrile obtained according to (f) is dried for 5 hours under high vacuum at room temperature, then 5 ml. of saturated ethanolic hydrogen chloride solution are added, the solution is left to stand for 24 hours at room temperature and then concentrated in vacuo whereupon a mixture of α-amino-3-hydroxy-5-isoxazole acetic acid iminoethyl ester hydrochloride and ammonium chloride remains.

(h) The iminoester hydrochloride and ammonium chloride mixture obtained according to (g) is dissolved in a little water and the solution is adsorbed on a cation exchanger column (Dowex 50, WX-12, H⁺-form, 50–100 mesh, pretreated with dilute hydrochloric acid and washed neutral with water). α-Amino-3-hydroxy-5-isoxazole acetic acid is eluted directly with 2 N formic acid. The formic acid eluate is quickly concentrated under water jet vacuum (12 torrs) and care is taken to avoid decarboxylation. The residue is recrystallised from water whereupon the above acid is obtained as hydrate, M.P. 144–145°.

(i) Instead of hydrolysing directly according to (g) the hydrochloric acid solution of the crude α-amino-3-hydroxy-5-isoxazole acetic acid ethyl ester formed from the iminoester hydrochloride obtained according to (f) on adding water thereto, this hydrochloric acid solution can also be evaporated under water jet vacuum under careful conditions. The hydrochloride of α-amino-3-hydroxy-5-isoxazole acetic acid ethyl ester is obtained by extraction with ethanol, from the mixture of salts obtained as residue and it is crystallised by concentrating the ethanolic extract in vacuo, or it is purified by preparative paper electrophoresis. On repeatedly recrystallising from ethanol, the hydrochloride mentioned is obtained as white needles which melt at 186–193°.

R_f 0.55–0.60 (yellow-brown on spraying with Ninhydrin; whitman 1, sec.-butanol/ethanol/glacial acetic acid/water 15:5:1:5).

Migration in paper electrophoresis 42 mm./h. (buffer pH 1.9 from glacial acetic acid/formic acid/water 3:1:16), 550 v., 5 ma. If, in (g), instead of ethanolic hydrogen chloride solution, methanolic hydrogen chloride solution is used, then the hydrochloride of α-amino-3-hydroxy-5-isoxazole acetic acid methyl ester is obtained in an analogous way; M.P. 152–153° (with decomposition), needles from methanol/ether. Yellow brown colour on spraying with Ninhydrin, R_f 0.41, migration in paper electrophoresis (see above) 35 mm./h.

(j) 500 mg. of the ethyl ester hydrochloride obtained according to (i) are dissolved in as little water as possible and the solution is adsorbed on a cation exchanger column (Dowex 50, WX-12, 50–100 mesh, H⁺-form, washed neutral). The column is then washed with water until it has a neutral reaction. The desired α-amino-3-hydroxy-5-isoxazole acetic acid is then eluted with 2 N formic acid. After carefully evaporating under vacuum, a yellowish white crystalline residue remains from which the hydrate of the acid mentioned is obtained by recrystallisation. M.P. 144–145°, cf. (h).

Example 3

(a) 14.45 kg. of fresh pilei of *Amanita muscaria* are finely minced in a large, high-speed mincing machine in the presence of about 50 litres of 95% ethanol. After filtering the slurry, the greatly squeezed out filter cake is again extracted with 80% ethanol in the same way. Both filtrates are combined and concentrated in a thin layer evaporator under water jet vacuum until a sirupy consistency is attained.

(b) The concentrate obtained is diluted somewhat with water and then defatted with large amounts of ether. Ether is removed from the aqueous phase by bubbling nitrogen through and then it is diluted with water to a solid content of about 1%.

(c) The aqueous solution obtained is chromatographed on a Dowex WX-12 (H⁺) column having a granule size of 50–200 mesh, preferably 50–100 mesh which has been prepared as follows: fresh ion exchanger is converted into the H⁺ form in the usual way by treatment with dilute hydrochloric acid and then washed neutral with water. Experience has shown that the ion exchanger can be used about 8 to 10 times before its selectivity becomes insufficient. Previously used ion exchanger is freed from strongly absorbant substances by washing with 2–4% ammonia solution each time before it is treated with hydrochloric acid.

About 1 kg. of ion exchanger is used per 300 g. dry substance of the aqueous solution to be treated. The ion exchanger is put into a glass column of suitable size which preferably is fitted with a tap at the bottom to regulate the outflow of the eluate. The aqueous solution obtained according to (b) is then poured into the column. The first eluate is strongly acid, the column is washed with water until the eluate has an almost neutral pH (between 6.5 and 7). The washing water is discarded and the column is eluted first with 5 liters of 1 N formic acid per kg. ion exchanger to remove previous fractions and then with 5–7 liters of 2 N formic acid per kg. ion exchanger to obtain the desired starting material. The eluate fraction obtained with 2 N formic acid is concentrated under water jet vacuum as quickly and as mildly as possible in order to completely remove the formic acid.

(d) A 1% aqueous solution is prepared from the carefully concentrated eluate and this is treated as described under (c) with an amount of ion exchanger corresponding to 20 times its solid content. The elution with formic acid, however, is performed by gradually increasing the concentration to double normality, preferably while maintaining a linear gradient and while splitting into numerous fractions. The individual fractions are tested by paper electrophoresis (cf. for example, H. Michl in Chromatography Reviews, vol. 1, edited by Michael Lederer, Elsevier Publ. Co., Amsterdam, 1959, pages 11–38). The fractions containing the desired starting material are those having a migration of the substance of 5.5 cm. toward the cathode on whatman paper No. 1 in a buffered system of formic acid/acetic acid/water 3:1:16 (all parts by volume) at 60 volts per cm. within 1 hour (development of the spot with a reagent for the end product given in the description under 1(a) to (c). These fractions are combined and concentrated very carefully under moderately reduced pressure, whereupon crystallisation occurs.

A fifth aspect of the invention concerns the novel lower alkyl esters of α-amino-3-hydroxy-5-isoxazole acetic acid, which esters correspond to the formula

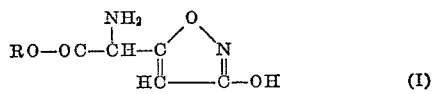

wherein R represents a lower alkyl radical, and also to the acid addition salts of these esters.

In the description of the fifth aspect of the invention given below, wherever reference is made to preceding numbers of formulas or examples, it is to the identified formula or example in connection with this fifth aspect of the invention.

Even in very low dosages, the novel compounds of this fifth invention aspect have an inhibiting action on the central nervous system. In particular they greatly potentiate anesthesia, reduce motility, have catatonic and sedative actions, inhibit the tremorin tremor and also have an antiemetic action. They are useful, in calmative amounts, in the treatment of sleep disturbances and of conditions of anxiety and agitation of various origin.

In the compounds of Formula I, R is, for example, the methyl, ethyl, n-propyl, isopropyl, n-butyl, isobutyl, sec.-butyl, tert.-butyl, n-pentyl, isopentyl or n-hexyl radical.

To prepare the compounds of Formula I, the α-amino-3-hydroxy-5-isoxazole acetic acid is converted by the methods known per se for esterification of amino acids, into its lower alkyl esters. For example, the acid mentioned is reacted at room temperature or slightly raised temperature with a lower alkanol in the presence of an acid condensing agent such as hydrogen chloride or concentrated sulphuric acid, an aromatic sulphonic acid such as p-toluene sulphonic acid or benzene sulphonic acid, also thionyl chloride or sulphuryl chloride. An excess of the alkanol to be reacted serves preferably as reaction medium.

In order to produce relatively high low alkanols corresponding to the definition of R, the methyl or ethyl ester is first produced in the way described and is then transesterified. For example, the methyl or ethyl ester is boiled under partial reflux with a propanol, butanol, pentanol or hexanol in the presence of a catalyst such as sodium methylate or aluminum isopropylate.

To produce low tert.alkyl esters, α-amino-3-hydroxy-5-isoxazole acetic acid can be reacted, for example, with 2-methyl-1-propene (isobutylene) or with 2-methyl-2-butene or 2-methyl-1-butene, in the presence of a strong mineral acid such as concentrated sulphuric acid, in an inert solvent. Suitable solvents are, e.g., glycols such as ethylene glycol or ether-like liquids such as ethylene glycol dimethyl ether.

The α-amino-3-hydroxy-5-isoxazole acetic acid which serves as starting material crystallises from water in the form of the hydrate which melts at 144–145°. An advantageous sequence of reactions for the production thereof starts, for example with the known 3-bromo- or 3-chloro-5-isoxazole carboxylic acid which can be prepared according to R. Fusco and S. Rossi, Rend., 1st., Lombardo Sci., Pt. I, Classe Sci. Mat. e. Nat. 94A, 729–740 (1960), CA 57, 16583d, e; or according to P. Bravo, G. Gaudiano, A. Quilico and A. Ricca, Gazz. Chim. Ital. 91, 47–64, particularly 60–63 (1961), CA 56, 12869e, etc. The starting material can be prepared by oxidation of 3-bromo- or 3-chloro-5-isoxazole propionic acid which is described by J. Thiele and H. Landers, Ann. 369, 300 etc. (1909). The sequence of reactions mentioned is more fully described in the example.

If desired, the low alkyl esters of α-amino-3-hydroxy-5-isoxazole acetic acid prepared according to the invention are converted with inorganic or organic acids such as hydrochloric acid, hydrobromic acid, sulphuric acid, phosphoric acid, methane sulphonic acid, 1,2-ethane disulphonic acid, 2-hydroxyethane sulphonic acid, acetic acid, lactic acid, oxalic acid, succinic acid, fumaric acid, maleic acid, malic acid, tartaric acid, citric acid, benzoic acid, salicylic acid, phenylacetic acid or mandelic acid, into the corresponding addition salts. Insofar as in the esterifications according to the invention salts are isolated directly due to the use of e.g., hydrochloric acid, as condensing agent, which salts contain a suitable, pharmaceutically acceptable acid component, such salts can also be further purified directly, e.g., recrystallised, i.e., without liberating the base in each case, and used as active substances.

The low alkyl esters of α-amino-3-hydroxy-5-isoxazole acetic acid and their addition salts with inorganic and organic acids can be administered orally, rectally or parenterally, in particular intramuscularly. For therapeutic administration, suitable salts are those with pharmaceutically acceptable inorganic and organic acids, i.e. with acids which in themselves have no physiological action in the usual dosages. For example, the salts with the acids mentioned above can be used as active substances instead of the free basic isoxazole derivatives.

The daily dosages of isoxazole derivatives of the general Formula I or of pharmaceutically acceptable salts thereof vary between 1 and 50 mg. for adult patients. Suitable dosage units such as dragées (sugar coated tablets), tablets, suppositories or ampoules, preferably contain 1–25 mg. of an isoxazole derivative of the general Formula I or of a pharmaceutically acceptable salt thereof.

Dosage units for oral administration preferably contain between 1% and 80% of an isoxazole derivative of the general Formula I or of a pharmaceutically acceptable salt thereof. They are produced by combining the active susbtance, e.g., with solid, pulverulent carriers as lactose, saccharose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowaxes) of suitable molecular weights, to form tablets or dragée cores. The latter are coated, e.g., with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g., to distinguish between varying dosages of active substance.

Examples of dosage units for rectal administration are suppositories which consist of a combination of the active substance with a neutral fatty foundation, or also gelatine rectal capsules which contain a combination of the active substance with polyethylene glycols (Carbowaxes) of suitable molecular weight.

Ampoules for parenteral, particularly intramuscular, administration contain an isoxazole derivative of the general Formula I or a water soluble salt thereof in a concentration of, preferably 0.1–2%, in aqueous solution, optionally together with suitable stabilising agents and buffer substances.

Tablets can be produced, for example, in the following manner:

(a) 10.0 g. of α-amino-3-hydroxy-5-isoxazole acetic acid ethyl ester hydrochloride, 30.0 g. of lactose and 5.0 g. of unpressed aerosil (highly dispersed silicic acid) are mixed, the mixture is moistened with a solution of 5.0 g. of gelatine and 7.5 g. of glycerine in distilled water and granulated through a sieve. The granulate is dried, sieved and carefully mixed with 3.5 g. of potato starch, 3.5 g. of talcum and 0.5 g. magnesium stearate. The mixture is pressed into 1,000 tablets each weighing 65 mg. and containing 10 mg. of active substance (hydrochloride).

Instead of the ethyl ester hydrochloride, also, e.g., the methyl ester hydrochloride or the corresponding free bases can be used.

(b) To produce ampoules, for example, 1.0 g. of α-amino-3-hydroxy-5-isoxazole acetic acid methyl ester hydrochloride and 2.2 g. of glycerine are dissolved in distilled water up to 200 ml. The solution obtained provides 100 ampoules of 2 ml. each containing 10 mg. (0.5%) active substance (hydrochloride).

If the amount of active substance is reduced to 200 mg., then 100 ampoules of 2 ml. are obtained each containing 2 mg. (0.1%) of active substance (hydrochloride).

Instead of the methyl ester hydrochloride, also the ethyl ester hydrochloride can be used.

The following examples further illustrate the performance of the process according to the invention without limiting the scope thereof in any way. The temperatures are given in degrees centigrade.

Example 1

A solution of 530 mg. (3 millimols) of α-amino-3-hydroxy-5-isoxazole acetic acid hydrate in 20 ml. of ethanol saturated with hydrogen chloride is left at 20° for 90 hours. The solution is then evaporated under vacuum, the resulting residue is dried over solid potassium hydroxide in a desiccator and finally crystallised from absolute ethanol leading to α-amino-3-hydroxy-5-isoxazole acetic acid ethyl ester hydrochloride, M.P. 186–193°, with decomposition.

The acid (hydrate) used as starting material can be prepared, for example, as follows:

(a) 30.7 g. (0.16 mol) of 3-bromo-5-isoxazole carboxylic acid and 27 g. (0.48 mol) of potassium hydroxide are stirred in 540 ml. of benzyl alcohol for 2 hours at 140°. After cooling, 1.5 liters of water are added to the reaction mixture which is then extracted with three 1.5 liter portions of ether. The aqueous phase is boiled for a short time with active charcoal, filtered and finally treated with concentrated hydrochloric acid. The resulting crystals are filtered off under suction, washed with water, dried and finally recrystallised from benzene to yield 5-benzyloxy-5-isoxazole carboxylic acid, M.P. 119–122°.

(b) 13.1 g. (60 millimols) of 3-benzyloxy-5-isoxazole carboxylic acid in 65 ml. of thionyl chloride and 65 ml. of toluene are refluxed for 12 hours. Both the solvent as well as excess reactant are distilled off at 60° under reduced pressure. A solution of the remaining crude acid chloride in 100 ml. of absolute ether is added dropwise to a solution of 2.6 g. (60 millimols) of ethyleneimine and 6.3 g. (62.5 millimols) of triethylamine in 150 ml. of absolute ether while stirring and cooling with ice. After 30 minutes' reaction at 0°, a suspension of 1.14 g. (30 millimols) of lithium aluminium hydride in 100 ml. of ether is added in portions to the resulting solution of N,N-ethylene-3-benzyloxy-5-isoxazole carboxamide. The mixture is stirred for another 30 minutes at 0° and subsequently treated with 200 ml. of 2 N sulphuric acid dropwise. The reaction solution is filtered through Hyflo, the ethereal phase is separated, washed twice with 1 N sodium bicarbonate solution, dried over magnesium sulphate and concentrated. The remaining 3-benzyloxy-5-isoxazole carboxaldehyde crystallises. According to thin layer chromatography and NMR spectra, the substance is pure and can be used directly for the next reaction.

(c) 6.5 g. of 100% hydrocyanic acid and 10 mg. of sodium cyanide are added to 12.2 g. (60 millimols) of 3-benzyloxy-5-isoxazole carboxaldehyde. After 10 minutes an exothermic reaction occurs and the reaction mixture solidifies. The mixture is left to stand for 12 hours; it is then dissolved in 200 ml. of absolute ether, treated with active charcoal and filtered. The ether is evaporated under reduced pressure whereupon 3-benzyloxy-5-isoxazole carboxaldehyde cyanohydrin is obtained, M.P. 92–98°, which is pure enough for the next step. On recrystallisation from benzene/cyclohexane (1:1) the melting point rises to 102–103°.

(d) 33 g. (900 millimols) of hydrogen chloride are introduced into an ice cooled solution of 14 g. (60 millimols) of crude 3-benzyloxy-5-isoxazole carboxaldehyde cyanohydrin in 140 ml. of absolute ethanol. The solution turns into a thick slurry within two hours and is left to stand at 20° for 48 hours. The solvent is then evaporated under reduced pressure and 100 ml. of water are added to the remaining crude 3-benzyloxy-5-isoxazole glycolic acid iminoethyl ester hydrochloride. The pale yellow oil thus formed is taken up in ether/benzene (1:1). The organic phase is washed with water, 1 N sodium bicarbonate solution and again with water, dried over magnesium sulphate and evaporated under reduced pressure leaving pale yellow crystals of 3-benzyloxy-5-isoxazole glycolic acid ethyl ester, M.P. 49–55°.

(e) 11.4 g. (60 millimols) of p-toluene sulphonyl chloride in 50 ml. of sym.-collidine are added to an ice cooled solution of 15.0 g. (54 millimols) of 3-benzyloxy-5-isoxazole glycolic acid ethyl ester in 20 ml. of sym.-collidine. After standing at 5° for 24 hours, a thick red slurry is formed which is dissolved in 1 liter of 1 N hydrochloric acid and 500 ml. of ether under ice cooling. The organic phase is separated, washed with 1 N hydrochloric acid, water, 1 N sodium bicarbonate solution and again with water before it is dried over magnesium sulphate and evaporated under reduced pressure. The residue, 19.2 g. of a red-violet mixture of oil and crystals, is dissolved in 50 ml. of benzene and chromatographed on 300 g. of Kieselgel. Cyclohexane elutes a small amount of p-toluene sulphonic acid chloride and benzene/chloroform (1:1); the desired 3-benzyloxy-5-isoxazole glycolic acid ethyl ester-p-toluene sulphonate which, after recrystallisation from hexane, melts at 75–78°.

(f) 10.8 g. (25 millimols) of 3-benzyloxy-5-isoxazole glycolic acid ethyl ester-p-toluene sulphonate and 5.15 g. (50 millimols) of sodium bromide are stirred for 3 hours in 100 ml. of dimethyl sulphoxide at 30°. The mixture is poured into one liter of ice water and the resulting mixture is extracted with three 500 ml. portions of ether/benzene (1:1). The combined organic phases are washed with 300 ml. of water, dried over magnesium sulphate and evaporated leaving 8.3 g. of an orange-coloured oil. This is dissolved in 50 ml. of benzene, chromatographed on 100 g. of Kieselgel and eluted with cyclohexane and benzene. After evaporating the benzene fraction, 3-benzyloxy-α-bromo-5-isoxazole acetic acid ethyl ester is obtained, $n_D^{21}$ 1.5458.

(g) 2.0 g. (5.9 millimols) of 3-benzyloxy-α-bromo-5-isoxazole acetic acid ethyl ester are stirred for 15 hours in a mixture of 20 ml. of 48° hydrobromic acid and 30 ml. of glacial acetic acid at 30°. The acetic acid is distilled off within 1 hour at 30° under 12 torrs. 200 ml. of water and solid sodium bicarbonate are added to the residue until an alkaline pH has been reached. After extracting with two 100 ml. portions of ether the aqueous phase is again acidified with 48% hydrobromic acid and extracted in a Kutscher-Steudel apparatus with ether for 20 hours. When the organic phase is dried over magnesium sulphate and evaporated, crude α-bromo-3-hydroxy-5-isoxazole acetic acid is obtained as a viscous oil. IR and NMR spectra as well as microtitration confirm its structure.

(h) 1.3 g. (5.9 millimols) of crude α-bromo-3-hydroxy-5-isoxazole acetic acid are left to stand at 20° in 28 ml. of concentrated ammonia solution for 5 hours. The excess ammonia is evaporated under 12 torrs whereupon 60 ml. of water, a small amount of active charcoal and Celite are added. Filtration gives a pale yellow filtrate which is evaporated at 40° under reduced pressure. The residue is dried over phosphorus pentoxide and finally stirred in a mixture of 20 ml. of methanol and 20 ml. of tetrahydrofuran. α-Amino-3-hydroxy-5-isoxazole acetic acid ammonium salt hydrate (M.P. 120° with decomposition) is obtained on filtration. The zwitterion hydrate melts at 144–145° and is obtained when the above ammonium salt is chromatographed on Amberlite IRC–50 using water and formic acid as eluants.

Example 2

α-Amino-3-hydroxy-5-isoxazole acetic acid methyl ester and its hydrochloride are produced analogously to Example 1 using methanol instead of ethanol. The hydrochloride melts, after recrystallisation from methanol/ether, at 152–153° (with decomposition).

We claim:
1. A method of treating conditions of excitement and disturbed sleep, comprising administering to a person suffering therefrom an effective amount of α-amino-3-hydroxy-5-isoxazole acetic acid or a pharmaceutically acceptable salt thereof.
2. A method of treating conditions of excitement and disturbed sleep, comprising administering to a person suffering therefrom an effective amount of a compound of the formula

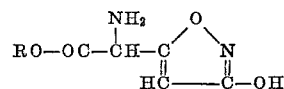

in which R is lower alkyl, or a pharmaceutically acceptable addition salt of said compound with an acid.

References Cited

Takemoto et al.: J. Pharm. Soc. (Japan), vol. 84, pp. 1186–1188 and 1232–1234.

ALBERT T. MEYERS, Primary Examiner

STANLEY J. FRIEDMAN, Assistant Examiner